(12) United States Patent
Baranoff

(10) Patent No.: US 11,746,987 B2
(45) Date of Patent: Sep. 5, 2023

(54) DEVICE FOR PROVIDING AESTHETIC LIGHTING

(71) Applicant: Sergei C. Baranoff, West Sacramento, CA (US)

(72) Inventor: Sergei C. Baranoff, West Sacramento, CA (US)

(*) Notice: Subject to any disclaimer, the term of this patent is extended or adjusted under 35 U.S.C. 154(b) by 0 days.

(21) Appl. No.: 16/742,220

(22) Filed: Jan. 14, 2020

(65) Prior Publication Data

US 2020/0224851 A1 Jul. 16, 2020

Related U.S. Application Data

(60) Provisional application No. 62/792,447, filed on Jan. 15, 2019.

(51) Int. Cl.
| | |
|---|---|
| *F21V 3/04* | (2018.01) |
| *F21V 3/02* | (2006.01) |
| *F21V 23/04* | (2006.01) |
| *F21V 8/00* | (2006.01) |
| *A46B 15/00* | (2006.01) |
| *A45D 33/00* | (2006.01) |

(Continued)

(52) U.S. Cl.
CPC .............. *F21V 3/04* (2013.01); *A45D 33/00* (2013.01); *A45D 40/262* (2013.01); *A46B 9/021* (2013.01); *A46B 15/0036* (2013.01); *F21V 3/02* (2013.01); *F21V 23/04* (2013.01); *G02B 6/0005* (2013.01); *A45D 2200/20* (2013.01); *A46B 2200/1046* (2013.01)

(58) Field of Classification Search
CPC ... F21V 3/04; F21V 3/02; F21V 23/04; F21V 33/0004; G02B 6/0005; G02B 6/0008; A46B 15/0036; A46B 9/021; A46B 2200/1046; A46B 5/0095; A46B 5/026; A45D 33/00; A45D 45/262; A45D 2200/20; A45D 40/262; F21L 4/00
See application file for complete search history.

(56) References Cited

U.S. PATENT DOCUMENTS

| | | | |
|---|---|---|---|
| 4,779,173 A * | 10/1988 | Carr ................... | A46B 15/0002 |
| | | | 15/105 |
| 6,623,272 B2 * | 9/2003 | Clemans ............ | A46B 15/0002 |
| | | | 433/215 |

(Continued)

FOREIGN PATENT DOCUMENTS

WO    WO2003/090692    * 11/2003

*Primary Examiner* — Peggy A Neils
(74) *Attorney, Agent, or Firm* — FENWICK & WEST LLP

(57) ABSTRACT

An applicator for beauty products comprises a lighting device for providing lighting when applying beauty products. In various embodiments, the lighting device is a hollow body enclosing a power supply, such as one or more batteries, with the power supply and including a light source. The light source is surrounded by an opaque body so the light source casts an even glow of light. Further, the light source has in such a shape or an orientation allowing the light source to emit beyond an outer perimeter of one or more interchangeable brush heads that are coupled to an outer circumference of the light source. The hollow body also includes a switch coupled to the power supply and to the light source. When activated, the switch completes a circuit providing power from the power supply to the light source, causing the light source to emit light.

9 Claims, 4 Drawing Sheets

(51) Int. Cl.
    *A45D 40/26*     (2006.01)
    *A46B 9/02*     (2006.01)

(56) References Cited

U.S. PATENT DOCUMENTS

| | | | | |
|---:|---|---|---|---|
| 6,991,345 B2 * | 1/2006 | Helenowski | ......... | A45D 33/008 |
| | | | | 362/137 |
| 9,044,083 B2 * | 6/2015 | Nanda | ................... | A46B 15/00 |
| 9,457,199 B2 * | 10/2016 | Lin | ...................... | A61N 5/0603 |
| 9,681,744 B2 * | 6/2017 | Russell | ............. | A46B 15/0036 |
| 10,470,559 B2 * | 11/2019 | Fleischer | ........... | A46B 15/0036 |
| 2008/0062678 A1 * | 3/2008 | Levy | .................. | F21V 33/0004 |
| | | | | 362/109 |
| 2014/0096332 A1 * | 4/2014 | Kitagawa | ........... | A61C 17/3481 |
| | | | | 15/22.1 |
| 2014/0304929 A1 * | 10/2014 | Rechtin | ................. | A46B 5/026 |
| | | | | 15/22.1 |
| 2016/0286948 A1 * | 10/2016 | Amron | ................. | A46D 1/0207 |
| 2017/0127815 A1 * | 5/2017 | Renfro | .................. | A46B 17/08 |
| 2017/0196350 A1 * | 7/2017 | Saltalamacchia | ... | F21V 23/0435 |
| 2018/0087883 A1 * | 3/2018 | Wynn | ...................... | F21L 4/00 |

\* cited by examiner

DEVICE FOR PROVIDING AESTHETIC LIGHTING

CROSS REFERENCE TO RELATED APPLICATIONS

This application claims the benefit of U.S. Provisional Application No. 62/792,447, filed Jan. 15, 2019, which is incorporated by reference in its entirety.

BACKGROUND

Proper lighting is an essential factor in applying beauty products such as foundation, blush, eyeliner and lip gloss. Most individuals rely on existing lighting solutions within the locations where make up is applied, such as lighting configurations in bathrooms and on counters. However, existing lighting solutions typically result in shadows, halos, and generally poor lighting conditions for properly illuminating areas to which beauty products are applied. Other lighting configurations for applying beauty products, such as freestanding mirrors with integrated lights or articulating mirrors with light rings, have been proposed for situations where beauty products are applied. However, these other lighting configurations (e.g., freestanding mirrors with integrated lights or articulating mirrors with light rings) do not provide a temporary or portable solution as they are typically fixed or bulky, requiring a user to lean into a mirror to which a light source is affixed.

SUMMARY

An applicator for beauty products comprises a lighting device for providing lighting when applying beauty products. In various embodiments, the lighting device is a hollow body enclosing a power supply, such as one or more batteries, with the power supply and including a light source. The light source is surrounded by an opaque body so the light source casts an even glow of light. Further, the light source has in such a shape or an orientation allowing the light source to emit beyond an outer perimeter of one or more brush heads that are coupled to an inner perimeter of the light source. Hence, the coupling of the one or more brush heads to the inner perimeter of the light source extends beyond the outer perimeter of the one or more brush heads. Different shapes or styles of brush heads, organizes to the hollow body or to the light source in different embodiments.

The hollow body also includes a switch coupled to the power supply and to the light source. When activated, the switch completes a circuit providing power from the power supply to the light source, causing the light source to emit light. When deactivated, the switch opens the circuit to disconnect power from the power supply to the light source. In various embodiments, the switch is a dimmable switch, allowing a user to regulate a brightness of light emitted by the light source by adjusting the switch. The hollow body may be removably coupled to a mirror or other surface in various embodiments to provide temporary lighting to the mirror or other surface. Hence, the lighting device allows a user to provide portable aesthetic lighting in various scenarios independent of availability of a surface for providing lighting.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
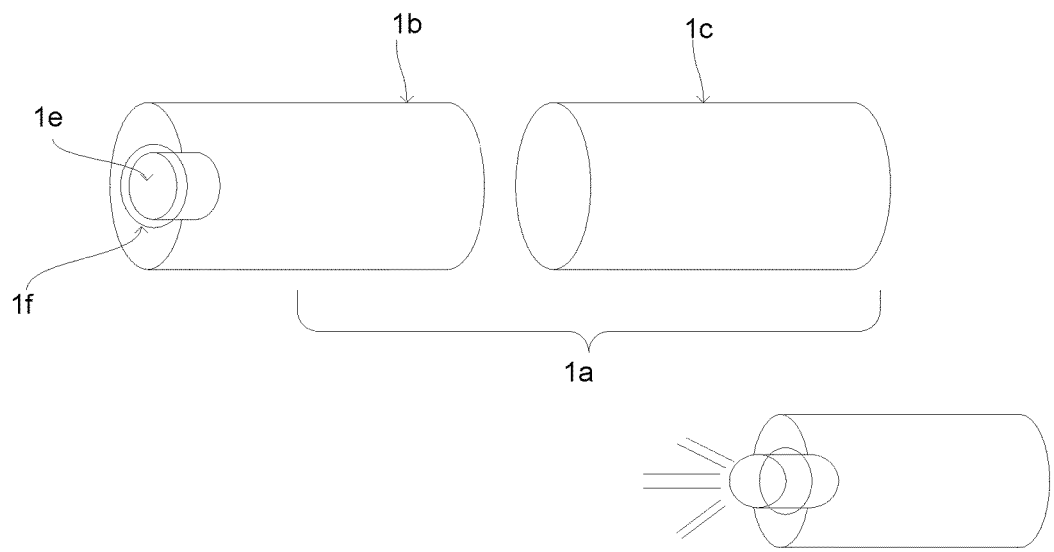
FIG. 1 is a plan view of a lighting device, according to one embodiment.

FIG. 1 is a plan view of one embodiments of a lighting device. In the example of FIG. 1, the lighting device comprises a hollow body 1*a* that is a cylinder. In the example of FIG. 1, the hollow body 1*a* comprises a first cylinder 1*b* and a second cylinder 1*c* which are configured to be coupled together. However, in other embodiments, the hollow body 1*a* has any suitable shape; for example, the hollow body 1*a* is rectangular, triangular, elliptical, a square, a star pattern, or any other suitable shape in various embodiments. One or more batteries are included within the hollow body 1*a* and enclosed by the first cylinder 1*b* and by the second cylinder 1*c* in various embodiments. Alternatively, other suitable power supplies are enclosed by the first cylinder 1*b* and by the second cylinder 1*c* when the first cylinder 1*b* and the second cylinder 1*c* are coupled to each other. When the first cylinder 1*b* and the second cylinder 1*c* are coupled, positive and negative terminals within the hollow body 1*a* are coupled to the enclosed one or more batteries or other power supply, completing a circuit between the one or more batteries, or other power supply, and a light source 1*e*, such as a light bulb. Completing the circuit provides power from the one or more batteries, or other power supply, to the light source 1*e*, causing the light source 1*e* to activate and emit light. In various embodiments, the first cylinder 1*b* and the second cylinder 1*c* are twisted together to couple the positive and negative terminals enclosed by the hollow body 1*a* to the one or more batteries (or other power supply); alternatively, the hollow body 1*a* includes a mechanical switch that couples the positive and negative terminals enclosed by the hollow body 1*a* to the one or more batteries or other power supply when activated (and decouples the positive and negative terminals from the one or more batteries, or other power supply, when deactivated).

Figure 2:
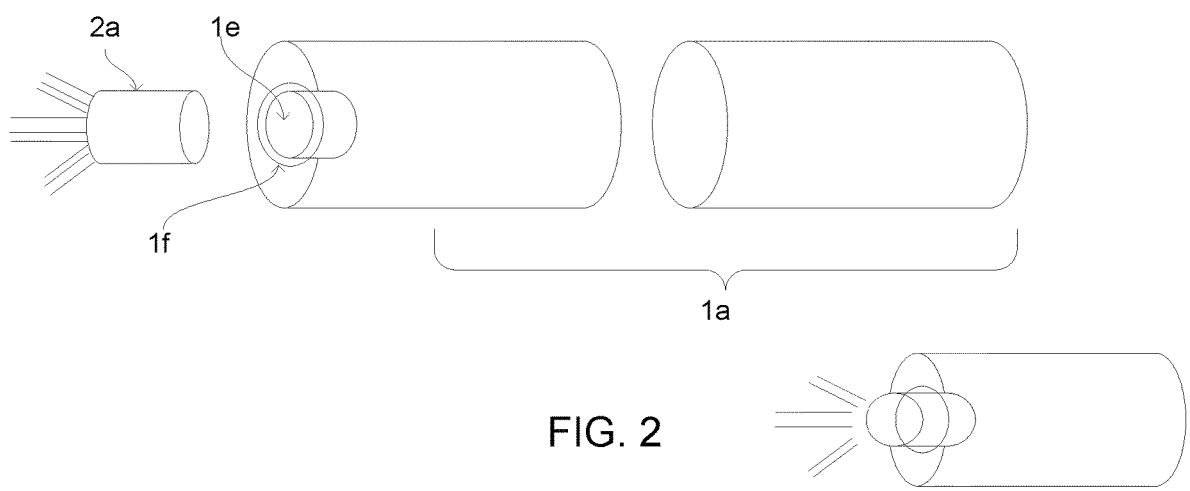
FIG. 2 is a lighting device having brush heads, according to one embodiment.

The light source 1*e* is surrounded by an opaque body if that allows the light source 1*e* to cast an even glow of light. In various embodiments, the light source 1*e* has a hole through its center. Further, the light source 1*e* has in such a shape or an orientation allowing the light source 1*e* to emit beyond an outer perimeter of one or more brush heads, coupled to an inner perimeter of the light source 1*e*. FIG. 2 shows an embodiment of a lighting device where brush heads 2*a* are coupled to the light source 1*e* or to the hollow body 1*a* (e.g., to the first cylinder 1*b* or to the opaque body 1*f*) so the brush heads 2*a* surround the inner perimeter of the light source 1e. Different shapes or styles of brush heads 2a may be coupled to the hollow body 1a or to the light source 1e in different embodiments.

Figure 3:
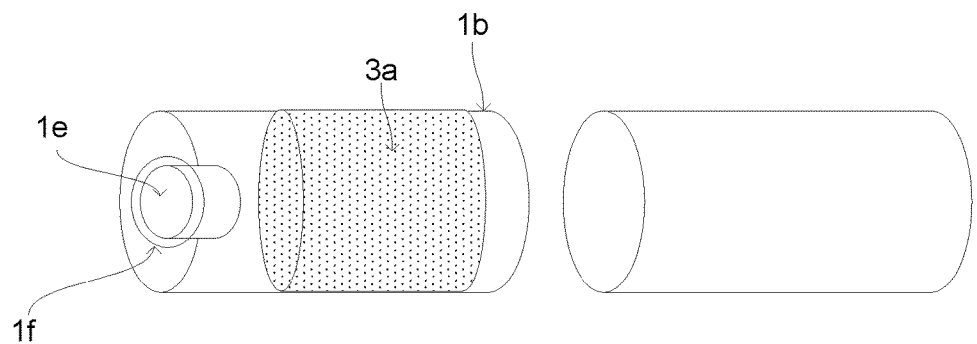
FIG. 3 is a lighting device with a collar is coupled to the hollow body, according to one embodiment.
Figure 3:
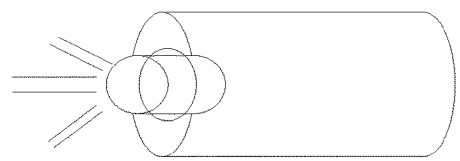

FIG. 3 shows an embodiment of a lighting device where a collar 3a is coupled to the hollow body 1a. In various embodiments, the collar 3a is configured to encircle an outer perimeter (or an outer perimeter) of at least a portion of the hollow body 1a. For example, in the example of FIG. 2, the collar 3a encircles a center portion of the hollow body 1a. The collar 3a may be rubber, silicone, or any other suitable of material in various embodiments. Further, the collar 3a may have different shapes, themes, colors, or tactile characteristics in different implementations.

Figure 4:
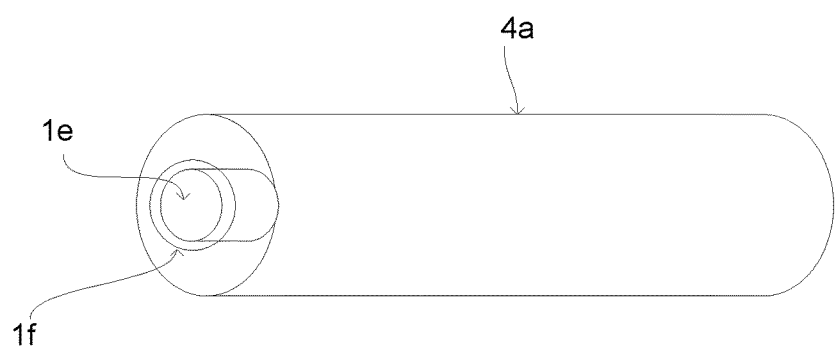
FIG. 4 is a lighting device comprising a single hollow body, according to one embodiment.
Figure 4:
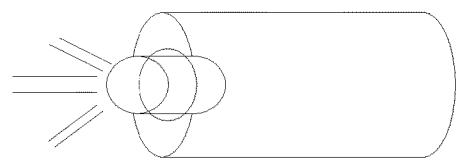

FIG. 4 shows an alternative embodiment of the lighting device where the lighting device comprises a single hollow body 4a. One or more batteries, or another power supply, are inserted into the single hollow body 4a. As further described above in conjunction with FIG. 1, the single hollow body 4a includes a switch for completing a circuit between the one or more batteries, or other power supply, and the light source 1e to activate the light source 1e to emit light.

Figure 5:
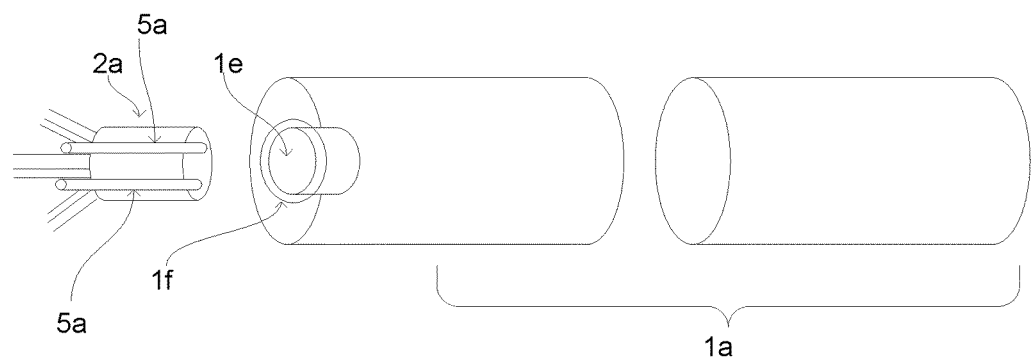
FIG. 5 is a lighting device having fiber optic strands contacting a light source, according to one embodiment.
Figure 5:
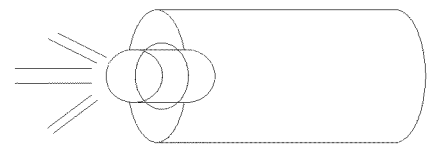

In another embodiment, shown in FIG. 5, fiber optic strands 5a are affixed to brush heads 2a. At the base of the brush heads 2a, a contact point is configured to contact the light source 1e. This directs light emitted by the light source 1e through the fiber optic strands 5a, allowing light to be directed thorough the brush heads 2a.

Figure 6:
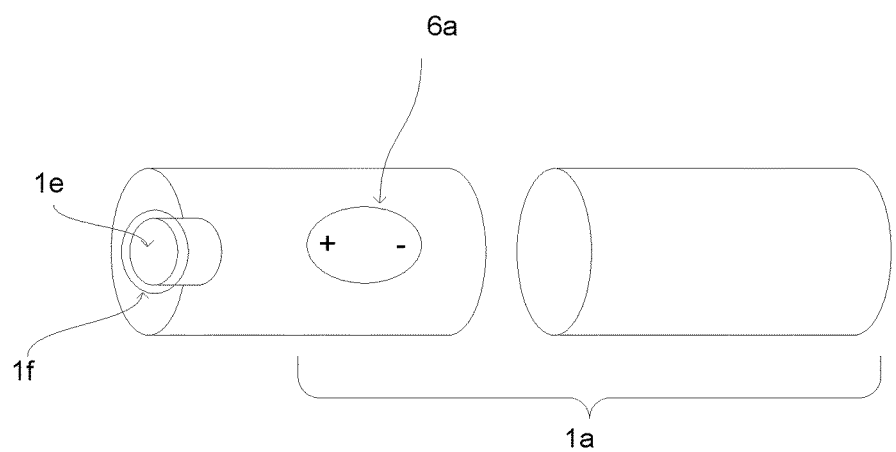
FIG. 6 is a lighting device including a dimmable switch, according to one embodiment.
Figure 6:
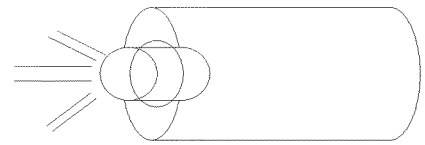

FIG. 6 shows an embodiment of the hollow body 1a where the switch coupling the one or more batteries or other power supply to the light source 1e is a dimmable switch 6a. This allows a user to vary a brightness of light emitted by the light source 1e by adjusting the dimmable switch 6a. Hence, the example shown by FIG. 6 allows a user to adjust light emitted by the light source 1e for different environments. For example, user may desire more light for large scale makeup application and adjust the dimmable switch 6a to increase brightness of the light source 1e or adjust the dimmable switch 6a to decrease brightness of the light source 1e for up close application or near the user's eyes The hollow body 1a may be coupled to a mirror and subsequently removed from the mirror. Hence, a user may attach the hollow body to a free-standing mirror, a fixed mirror, or a mobile mirror to provide light in different locations. Those skilled in the art will appreciate multiple variations of the method and understand that this is not an exhaustive list of embodiments. Such affixing of aesthetic lighting may be beneficial for other beauty applications such as lipstick tubes, eyeliner sticks, hair brushes as well as personal grooming products.

Figure 7:
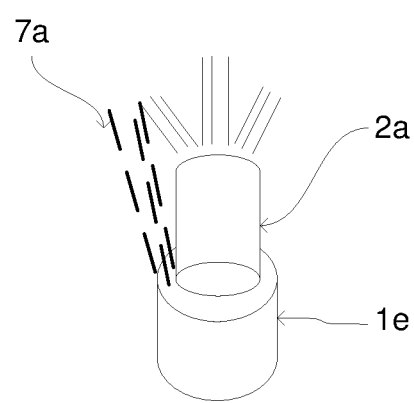
FIG. 7 is an example coupling of one or more brush heads to a light source, according to one embodiment.

FIG. 7 shows one embodiment of coupling brush heads 2a to the light source 1e. In the example of FIG. 7, the brush heads 2a couple to an inner perimeter of the light source 1e so a light 7a emitted by the light source 1e extends beyond the brush heads 2a. This allows the emitted light 7a to extend beyond the brush heads 2a and to surround the brush heads 2a. Further, different brush heads 2a may be interchangeably coupled to the light source 1e in different embodiments.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. An applicator device for a beauty product configured to provide lighting for a user thereof, the applicator device comprising:
   a hollow body;
   a power supply enclosed by the hollow body;
   a light source coupled to the power supply to supply energy to power the light source;
   one or more brush heads interchangeably coupled within an inner perimeter of the light source, wherein the light source extends beyond and continuously around the inner perimeter and is configured to direct light from outside the inner perimeter of the light source and into a volume circumferentially surrounding the brush heads;
   fiber optic strands affixed to the brush heads, a fiber optic strand contacting the light source at a contact point and directing light emitted by the light source through the fiber optic strand to direct light emitted by the light source through the brush heads; and
   a switch coupled to the light source and to the power supply, the switch configured to control a supply of power from the power supply to the light source when activated.

2. The lighting device of claim 1, wherein the switch comprises a dimmable switch configured to adjust a brightness of light emitted by the light source.

3. The lighting device of claim 1, wherein the light source comprises a light bulb.

4. The lighting device of claim 1, wherein the hollow body is cylindrical.

5. The lighting device of claim 4, wherein the hollow body comprises a first cylinder configured to be coupled to a second cylinder, with the power supply enclosed when the first cylinder is coupled to the second cylinder.

6. The lighting device of claim 1, further comprising:
   a collar coupled to the hollow body and configured to surround an outer perimeter of at least a portion of the hollow body.

7. The lighting device of claim 6, wherein the collar comprises rubber.

8. The lighting device of claim 6, wherein the collar comprises silicone.

9. The lighting device of claim 1, wherein the light source is surrounded by an opaque body and configured so the light source casts an even glow of light through the opaque body.

* * * * *